May 14, 1929.  C. J. W. CLASEN  1,712,745
RAILWAY CAR TRUCK
Filed Nov. 18, 1927  2 Sheets-Sheet 1

INVENTOR
C.J.W. Clasen
BY
Evans & McCoy
ATTORNEYS

May 14, 1929.  C. J. W. CLASEN  1,712,745
RAILWAY CAR TRUCK
Filed Nov. 18, 1927    2 Sheets-Sheet 2

INVENTOR
C. J. W. Clasen
BY Evans & McCoy
ATTORNEYS

Patented May 14, 1929.

1,712,745

UNITED STATES PATENT OFFICE.

CLAUS J. WERNER CLASEN, OF DAVENPORT, IOWA, ASSIGNOR TO THE BETTENDORF COMPANY, OF BETTENDORF, IOWA, A CORPORATION OF IOWA.

RAILWAY-CAR TRUCK.

Application filed November 18, 1927. Serial No. 234,138.

This invention relates to railway car trucks and while it is to be understood that the invention is of quite general application to structures mounted to travel on railway tracks, the truck herein shown is particularly designed for railway freight cars.

The present invention has for its object to provide a truck having independently mounted wheels which is of simple and rugged construction and which is so constructed that the independent mounting of the wheels is obtained without increase in the weight of the truck and without sacrificing strength or durability, and further to provide a truck which is easy to assemble and inexpensive to manufacture.

Further objects are to provide a truck in which rail friction, bearing friction and flange and tread wear of the wheels are reduced to a minimum and to provide a construction such that repairs to springs, wheels, brakes and other parts of the truck are greatly facilitated.

A further object is to provide a truck in which separate rigid frames are provided for the wheels at each side of the truck and in which the separate frames are securely joined.

A further object is to provide a truck of the independent wheel type in which the main frame members are of identical construction and interchangeable so that the manufacture thereof is simplified and the assembly of the frame members facilitated.

Another object of the invention is to provide a truck having greater durability by reason of the fact that the wear on the wheels and frame members is reduced to a minimum.

With the above and other objects in view, the invention may be said to comprise the structure as illustrated in the accompanying drawings hereinafter described and particularly set forth in the appended claims together with such variations and modifications thereof as will be apparent to one skilled in the art to which the invention appertains.

Reference should be had to the accompanying drawings forming a part of this specification in which.

Figure 1:
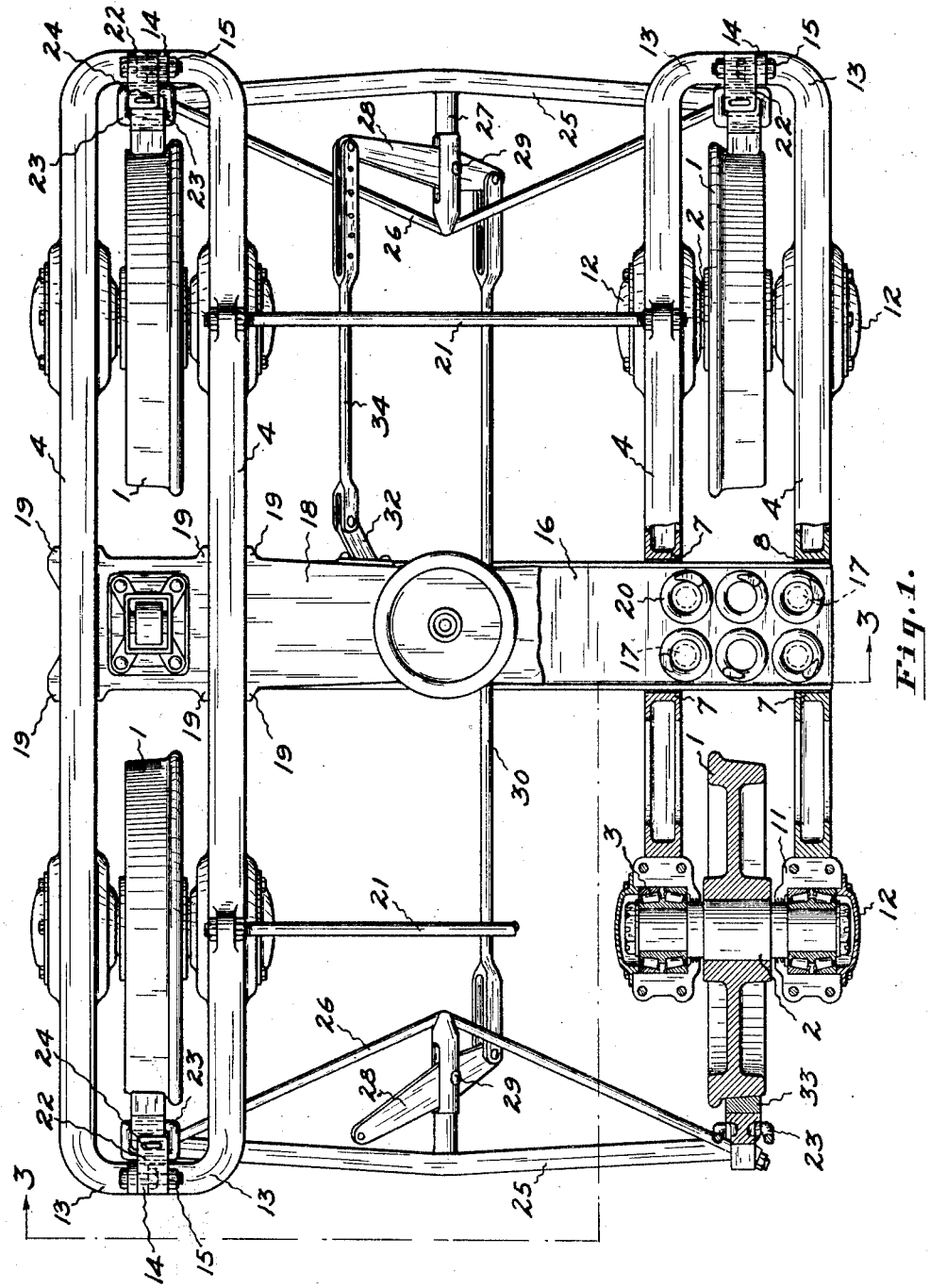
Figure 1 is a top plan view of the truck with the frame members broken away at one corner to show the axle bearings.

Referring to the accompanying drawings, the truck wheels 1 are flanged car wheels and each is mounted on a separate short axle 2, each axle projecting upon opposite sides of its wheel and mounted in a suitable thrust bearing 3 supported in longitudinal frame members 4. Frame members 4 are arranged in pairs at opposite sides of the truck and each pair is rigidly secured together to provide rigid laterally spaced side frames for the front and rear wheels at each side of the truck.

The frame members 4 are preferably castings of identical form and each frame member has an arched top chord 5 and a bottom chord 6 of truss form. While the frame members are shown as U-shaped in section it is obvious that they may be L-shaped or T-shaped if desired. Adjacent the center, the top and bottom chords 5 and 6 are joined by spaced integral columns 7 which provide between them a substantially rectangular opening 8. The bottom chord 6 joins the top chord 5 at a point spaced from the ends of the frame member so that the frame member has extensions 9 at its opposite ends which overlie the wheel axles and project beyond the wheels. Suitable bearings for the axles are provided in the frame members, the bearing receiving portions of the frame members being adjacent to the ends of the bottom chords 3 and these bearing portions may be formed by a bearing 10 formed in each of the extensions 9 and removable bearing retaining members 11 which are secured to the under side of the frame member to complete the cylindrical opening in the frame members within which the outer race rings of the roller thrust bearings fit, the bearings being retained within the frame members by means of caps 12 bolted to the outer faces of the members.

Each frame member 4 is provided with end portions 13 which extend laterally the same direction and each laterally extending portion 13 is provided with attaching flanges. In assembling the frame, the two frame members of each pair are reversely positioned with their attaching flanges 14 in contact and are rigidly secured together by any suitable means such as bolts 15 passing through the attaching flanges. The two frame members rigidly attached together at their opposite ends in front of the front wheel and to the rear of the rear wheel provide a rigid side frame for mounting the front and rear wheels at one side of the truck. A rigid connection is provided between the two side frames adjacent the center of the truck by means of a channel shaped spring plank 16, which extends across the truck and has its end portions seated upon the bottom chords 6 at the bottoms of the bolster receiving openings 8. The bottom chords 6 of the frame members are provided with integral lugs 17 which project upwardly into openings formed in the ends of the spring plank and these lugs serve to lock the two side frames to the spring plank 16 to resist side thrust and to hold the side frames rigidly against relative lateral movement. The bolster 18 is yieldably mounted on the frame members and has its opposite end portions slidably mounted in the upper portions of the openings 8. It will be understood that the bolster may be supported and guided in the frame members in various ways and that various bolster guides and supports may be employed which will permit limited lateral movement of the bolster with respect to the frame members. As herein shown the bolster is provided with guide ribs 19 upon its opposite side faces which overlie the inner and outer side faces with the columns 7 at the sides of the openings. The bolster 18 is yieldably supported at its opposite ends by means of a suitable number of coiled springs 20, which are seated upon the spring plank 16 within the confines of the frame members which may be joined adjacent their front and rear ends by tie rods 21 to assist the spring plank 16 in holding the frame members against relative lateral movements.

Each of the frame members 4 has on one of its lateral bent end portions 13, a brake beam supporting bracket 22 so that when the frames are assembled, one of the brackets 22 is positioned adjacent each of the four corners of the truck, one in advance of each of the front wheels and one in the rear of each of the rear wheels. Supporting links 23 are suspended from the brackets 22 and these links are retained on the brackets by means of retaining pins 24. At each end of the frame are connected transversely extending brake beams 25, each of which is provided with a truss rod 26 connected at its ends to the ends of the beam and supported at the center upon the outer end of a strut 27 rigidly connected to the beam and extending inwardly therefrom. Each of the struts 27 is slotted to receive an actuating lever 28, the actuating levers extending through the slots in the struts and being connected to the struts by pivots 29. The lower ends of the levers 28 are connected by a link 30 and one of the levers is adapted to be connected at its upper end to the usual brake actuating mechanism mounted on the car. The upper end of the other lever is connected by a link 34 to a bracket 32 fixed to the bolster. The brake beams 25 are provided at each end with a brake shoe 33 and normally hang in a position in which the brake shoes are spaced from the wheels. Upon actuation of the levers 28, both brake beams are pulled toward the adjacent wheels and the brake shoes 33 are brought into engagement with the wheels with a pressure proportional to that applied to the levers. The mounting of the brake beams at the ends of the frame makes them readily accessible for replacement or repair, either brake beam being readily removable by releasing the links 23 from the supporting hooks 22. Each wheel is readily removable independently of the others, it being necessary merely to jack up the side frame at the end thereof in which the wheel is mounted and remove the half bearings 11 whereupon the wheel axle is free from the frame members.

Figure 2:
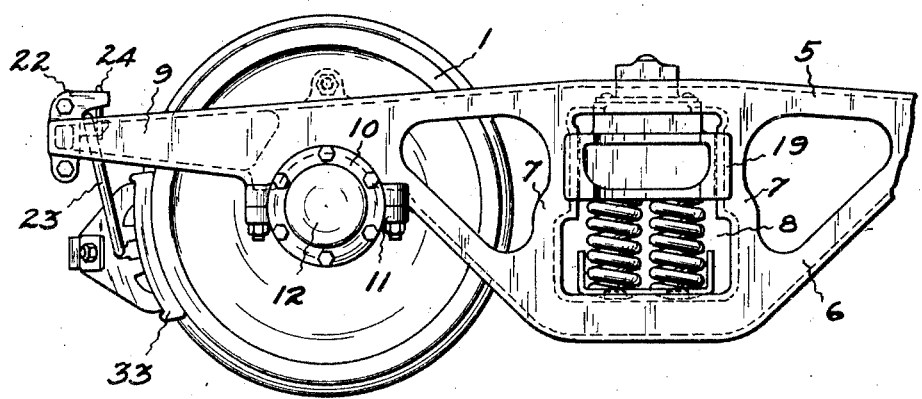
Fig. 2 is a fragmentary side elevation of the truck.
Figure 3:
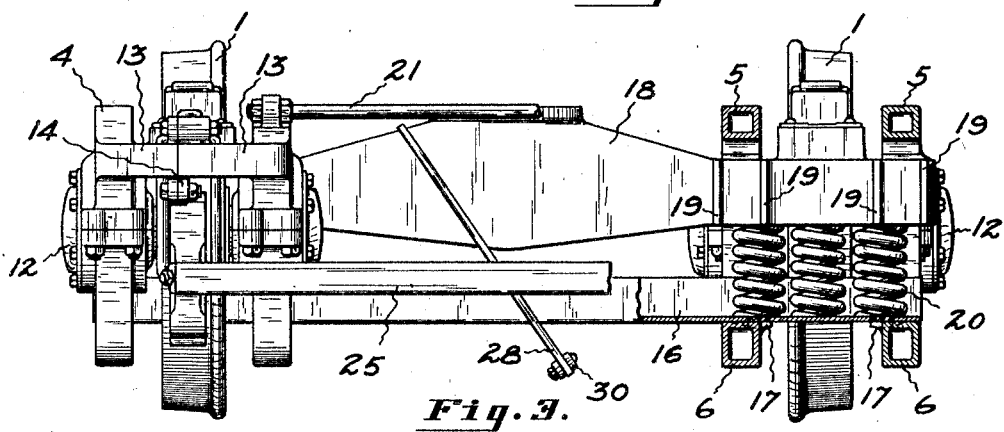
Fig. 3 is an end elevation of the truck partially in section on the line indicated at 3—3 in Fig. 1.
Figure 4:
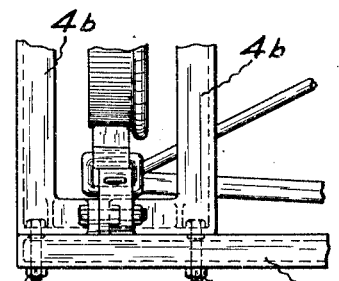
Figs. 4 and 5 are a fragmentary plan view and fragmentary side elevation, respectively, showing a modification of the frame structure.
Figure 5:
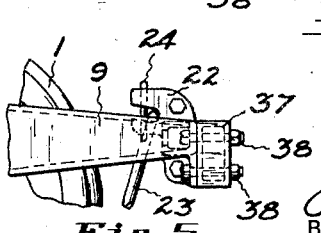

In the modification shown in Figs. 4 and 5, the frame members 4$^b$ are constructed exactly the same as in the construction shown in Figs. 1 to 3, except that the laterally bent end portions have outer faces at right angles to the side faces of the members so that an end member 37 may be secured against the end face of each frame member by suitable means such as bolts 38.

Figure 6:
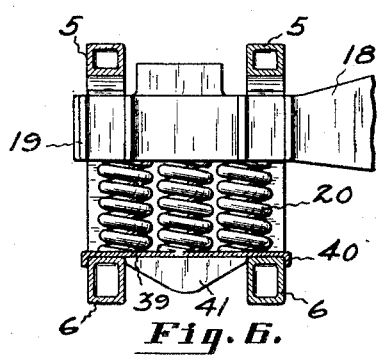
Fig. 6 is a detail view showing a spring seat which may be employed in trucks whose frames are constructed as shown in Figs. 4 and 5.

In Fig. 6 of the drawing, there is shown a spring seat 39 which rests upon the bottom chords 6 of the side members of each of the side frame units, and this spring seat is provided with downturned end flanges 40, which engage the outer faces of the bottom chord 6 and with reinforcing ribs 41 which lie transversely between the bottom chord 6 and terminate short of the end flanges 40 to permit the seat to lie flat upon the top surfaces of the chord 6 and to provide the shoulders overlying the inner faces of the chords. The individual spring seats such as shown in Fig. 6 may be employed in place of the spring plank 16 where rigid tie members connect end portions of the frame members as shown in Figs. 4 and 5.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

What I claim is:

1. A truck having side frames each composed of two laterally spaced frame members rigidly connected together at their ends, each frame having a brake supporting bracket at each end, each bracket being integral with a frame member, front and rear wheels within each of said frames on axles mounted in said frame members, and means rigidly connecting central portions of said side frames.

2. A truck having side frames each composed of two laterally spaced frame members rigidly connected together at their opposite ends, each frame member having a compression chord, a tension chord and a bolster receiving opening between said chords, front and rear wheels within each of said frames on axles mounted in said frame members, means rigidly connecting central portions of said wheel carrying frames, and brake beams suspended from the ends of said side frames, the ends of said side frames projecting past the front and rear wheels being wholly above the axes of the wheels.

3. A truck having side frames each composed of two laterally spaced identical and interchangeable frame members rigidly connected together at their opposite ends, each frame member having a brake supporting bracket formed integrally therewith at one end, front and rear wheels within each of said frames on axles mounted in said frame members, and a spring plank rigidly connecting central portions of said side frames.

4. A truck having side frames each composed of two laterally spaced frame members rigidly connected together at their ends, front and rear wheels within each of said frames on axles mounted in said frame members, spring plank means rigidly connecting central portions of said side frames, and tie rods connecting said side frames adjacent the ends thereof to hold the same in spaced relation.

5. A truck having side frames each composed of two laterally spaced frame members rigidly connected together at their opposite ends, each frame member having a compression chord and a tension chord and a bolster receiving opening between said chords, front and rear wheels within each of said frames, each wheel being mounted on a separate axle, bearings carried by the frame members encircling said axles, a spring plank rigidly connecting central portions of said side frames, and means connecting said side frames adjacent the ends thereof to hold the same in spaced relation.

6. A truck having side frames each composed of two substantially identical longitudinal side members, each side member having opposite end portions bent laterally and provided with attaching portions, the two side members of each side frame being oppositely disposed with their attaching portions rigidly secured together, front and rear wheels within each of the frames, and means connecting the central portions of said side frames.

7. A truck having side frames each composed of two substantially identical castings, each having its opposite ends bent laterally and provided with attaching flanges, the castings of each frame being reversely disposed with their attaching flanges in contact and rigidly secured together, a brake beam supporting member formed integrally with one of the laterally bent end portions of each of said frame members, a front and rear wheel within each of the two frames, and means rigidly connecting said frames between the front and rear wheels.

8. A truck having separately mounted wheels and side frames each composed of two substantially identical longitudinal frame members, each having means spaced from the opposite ends thereof for receiving axle bearings, said members having end portions overlying the wheel axles and projecting past the front and rear wheels above the axles, each member having a relatively deep central portion between the bearing receiving portions provided with bolster receiving openings, means rigidly connecting the ends of the frame members of each of the wheel carrying frames, a bolster, a spring plank rigidly connecting the two frames centrally of the truck, springs interposed between the plank and bolster, and brake beams suspended from the projecting end portions of the frames.

In testimony whereof I affix my signature.

CLAUS J. WERNER CLASEN.